Dec. 30, 1969　　　T. G. CAMPBELL　　　3,486,254
PIVOTED CUTTING EDGE FOR EARTHMOVING SCRAPERS
Filed May 1, 1967　　　　　　　　　　　　2 Sheets-Sheet 1
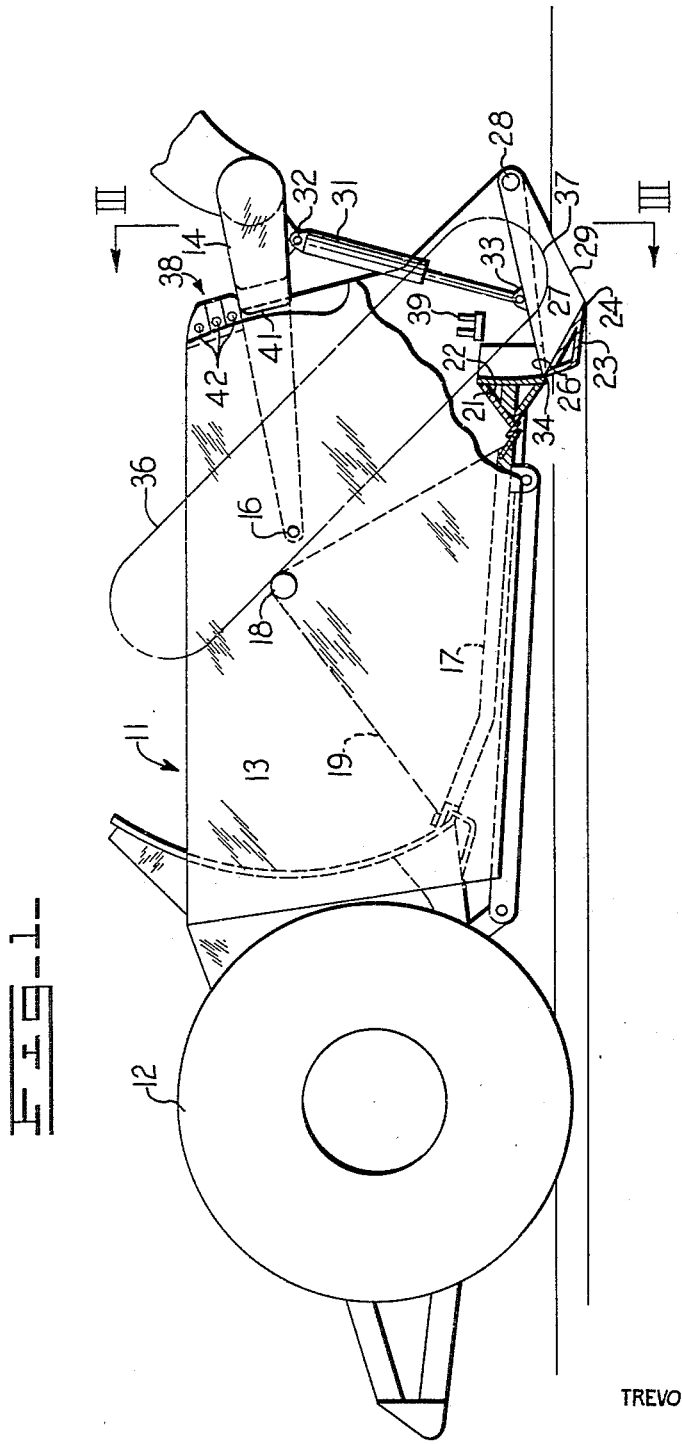
INVENTOR.
TREVOR G. CAMPBELL
BY
ATTORNEYS

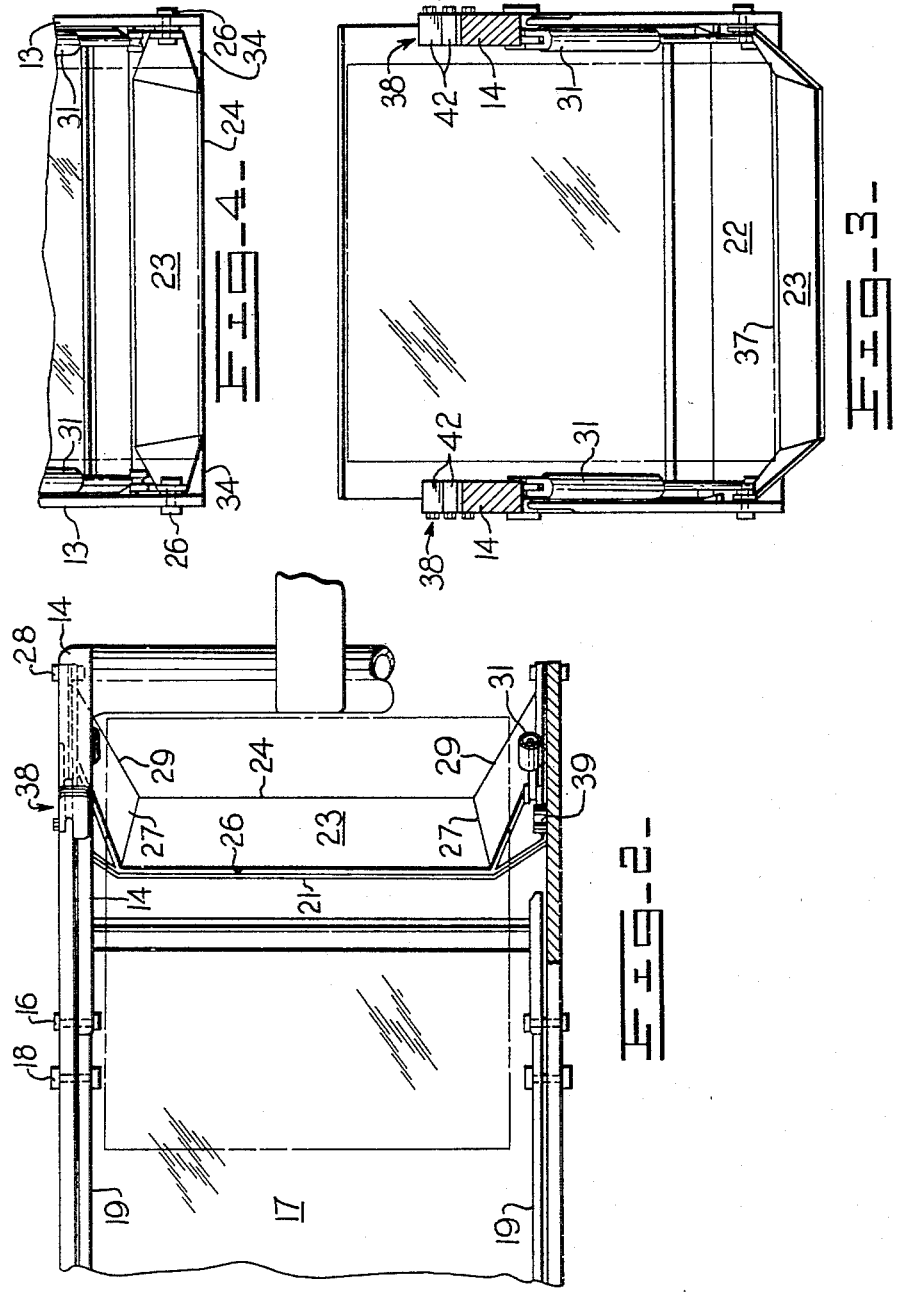

United States Patent Office 3,486,254
Patented Dec. 30, 1969

3,486,254
PIVOTED CUTTING EDGE FOR EARTH-
MOVING SCRAPERS
Trevor G. Campbell, Peoria, Ill., assignor to Caterpillar
Tractor Co., Peoria, Ill., a corporation of Illinois
Filed May 1, 1967, Ser. No. 635,167
Int. Cl. E02f 3/64, 3/81
U.S. Cl. 37—129                                 5 Claims

ABSTRACT OF THE DISCLOSURE

An improved earthmoving scraper which is rapidly adjustable for efficient loading or finishing operation. The cutting blade of the scraper is shorter than the width of the scraper bowl and is pivotably connected to the bowl sidewalls by sidebits which extend forwardly, outwardly and upwardly from each end of the cutting blade to pivot connections with the adjacent bowl sidewall. Hydraulic jacks are pivotably connected between the sidebits and the draft arms of the scraper to lower the cutting edge of the blade for loading and to raise the blade to permit a portion of a forward edge of the bowl floor to provide a strike off edge extending the width of the bowl for finishing work.

Background of the invention

The present invention relates to earthmoving scrapers and more particularly to an improved earthmoving scraper having a pivoted cutting edge to facilitate the use of the scraper for either production or clean-up operation.

Earthmoving scrapers are generally not adapted for frequent changes between production operation and finishing or clean-up operation because of the different requirements in each mode of operation. To accomplish the digging and loading which are necessary during production operation, a straight blade the width of the scraper bowl is generally not suitable because of lack of sufficient power to load the bowl without the aid of a pusher tractor. Thus, a stinger bit which is shorter than the scraper bowl width is commonly used in loading. However, in clean-up operations, the use of a stinger bit is undesirable since it cannot accomplish a wide even surface cut.

One method of overcoming the above problem was described in my assignee's patent application Ser. No. 463,567 filed June 14, 1965 to Robert G. Wagner describing an earthmoving scraper having a short blade and two sidebits. However, the scraper cutting blade described in that patent application reduces the efficiency of the scraper during clean-up work because it is short.

Summary of the invention

The present invention provides an earthmoving scraper which may be rapidly altered for efficient use in either production or finish operation. A cutting edge is pivotably connected to the scraper in front of the forward edge of the scraper bowl and is less than co-extensive with the width of the scraper bowl. Control means are disposed with relation to the pivotable blade to lower its cutting edge substantially below the forward edge of the bowl during loading to accomplish the required digging and loading with reduced power requirements. The cutting edge is raised during clean-up operation to permit at least a portion of a strike off edge, along the forward edge of the bowl, to produce a cut co-extensive with the width of the bowl.

Brief description of the drawings

FIG. 1 is a side view in elevation of the improved elevator scraper in a production loading position.

FIG. 2 is a partial plan view of the elevator scraper of FIG. 1 with the scraper elevator shown only in phantom to more clearly illustrate the pivoted cutting blade and its connection to the scraper.

FIG. 3 is a partial front view in elevation of the elevator scraper of FIG. 1 illustrating the pivoted cutting blade in a lowered position for production loading.

FIG. 4 is a partial front view in elevation similar to FIG. 3 but with the pivoted cutting blade raised for finish or clean-up operation.

Description of a preferred embodiment

Although the present invention is particularly described with reference to an elevator scraper as illustrated in FIG. 1, its use is not limited thereto but may also be employed with an earthmoving scraper of the type which does not include an elevator, but which depends only upon the forward motion of the scraper to load material over the cutting edge and into the scraper bowl. Referring now to FIG. 1, the earthmoving scraper has a bowl 11 which is pivotally supported at the rear by a pair of wheels, one of which is illustrated at 12, and which has two sidewalls, one of which is indicated at 13. Each sidewall is separately connected to an individual draft arm 14 by a pivot connection indicated at 16, and the draft arms extend forwardly for connection to a tractor (not shown) in the usual manner. The bowl is raised or lowered about its pivot connections with the draft arms into suitable positions for loading or carrying operations. The bowl has a floor indicated at 17 which is pivotally connected to the bowl sidewalls 13 at pivot points 18 by members 19 which extend upwardly from the sides of the floor. The floor is pivotable rearwardly to provide an opening in the bottom of the bowl for unloading of material.

To complement the pivotable cutting blade of the present invention, a back-up and strike off plate 21 is disposed along the forward end of the bowl floor and has an arcuate forward surface indicated at 22. Referring also to FIG. 2, a cutting blade 23 which is shorter than the distance between the sidewalls has a forward cutting edge 24 and a rear edge 26 which is adjacent the forward arcuate surface 22 of the back-up plate. The cutting blade has a sidebit 27 at either end thereof which is connected to one of the sidewalls 13 at a pivot point 28. Each bit has a forward cutting edge 29 which extends outwardly, upwardly and forwardly from the end of the cutting blade to its pivot connection with the sidewall. A cutting blade with sidebits having this configuration along with its adavntages of reducing power requirements during scraper loading was disclosed in the above noted copending patent application Ser. No. 463,567. As noted in that patent application, this blade configuration takes advantage of soil failure cones and also of the shear plane which precedes and extends laterally from a cutting edge moving through the soil as was explained in U.S. Patent No. 3,049,819 issued Aug. 21, 1962 to Cohron and Mayo. In the present invention, the position of the pivotable blade is controlled by suitable control means, for example, a pair of hydraulic jacks, one of which is indicated at 31 connected between the draft arms and the sidebits of the cutting blade at respective pivot points 32 and 33. The advantages of the above noted references accrue when the cutting blade is pivoted downwardly to have its forward cutting edge substantially below the back-up plate and the floor of the scraper bowl. However, to permit efficient operation of the scraper during finishing work, the present pivotable cutting blade is raised upwardly by the jacks 31 so that the cutting edge 24 of the cutting blade is at least as high as the lower strike off edge 34 of the arcuate back-up plate as is illustrated in FIG. 4. In this raised position, at least a portion of the back-up plate 21 cooperates with the cutting blade to provide a strike off plate which is co-extensive with the width of the scraper bowl for finish grading. Since the power required for loading is not needed for finishing work, the wide strike off plate increases the efficiency of the scraper during this cycle of operation. Further, the pivoted construction of the present cutting blade permits it to be rapidly altered for efficient operation during either loading or finishing operation.

As noted above, the illustrated scraper has an elevator, the position of which is indicated at 36, which projects forwardly and downwardly to have its forward end 37 generally above and forward of the cutting blade 23. The back-up plate extends above the bowl floor to insure proper engagement of the elevator with material to be loaded into the bowl. It is to be noted, from either of FIGS. 2 and 3, the cutting blade 23 must be at least just sufficiently long to prevent undesirable contact between the elevator and either the cutting blade 23 or its side bits 24. According to the above noted references, the sidewise projection of the sidebits from the cutting blade should be at an angle of approximately 35° with the ground during loading to take advantage of the generally accepted average shear plane angle for typical soils.

To alter the position of the scraper bowl and the cutting edge as necessary for the scraper to operate in loading, carrying and finishing cycles, separate hydraulic jacks or separate pairs of hydraulic jacks may be employed to individually control the position of the scraper bowl and the position of the cutting blade. However, to minimize the manipulative duties of the scraper operator, the control means for both the scraper bowl and the cutting blade is the single pair of jacks 31 connected between the draft arms and the sidebits of the cutting blade.

To provide greater versatility in the positioning of the bowl and cutting blade, a first pair of stops, one of which is indicated at 38 in FIG. 1, is affixed to the sidewalls 13 above the draft arms 14. Each stop extends inwardly over the adjacent draft arm to limit the downward motion of the elevator bowl with respect to the draft arms. A second pair of stops, which is indicated at 39 in FIG. 1, is also affixed to the bowl sidewalls, each stop extending inwardly above one of the sidebits 27 of the cutting blade. The second stops 39 are so positioned on the sidewall that when the cutting blade is raised by the jacks 31 to have its cutting edge 24 horizontally aligned with the lower edge 34 of the back-up plate, further upward motion of the blade relative to the bowl is prevented by the second stops and continued retraction of the jacks 31 serves to raise both the cutting blade and the scraper bowl. To permit the scraper operator to rapidly alter the positions of the scraper bowl and the cutting blade for either loading, finishing or carrying operations by actuation of the jacks 31, the first stops 38 are positioned to limit the downward motion of the bowl when the lower edge of the back-up plate is in a proper position for finishing work. Extension of the hydraulic jacks 31 could be terminated at this point for finishing work or for loading while continued extension of the hydraulic jacks 31 would position the cutting blade below the bowl floor and back-up plate in a proper position for loading as illustrated in FIGS. 1 and 3.

However, as illustrated in FIG. 1, the first stops 38 are preferably segmented so that by addition or removal of stop elements 42, the position of the bowl when its downward motion is limited by contact of the stop with the draft arm may be varied. This feature is particularly important for maintaining the desired angles between the cutting blade or its sidebits and the ground. For example, assume that FIG. 1 illustrates the cutting blade in a position for making an 8" cut of soil, such as might be typical for average soil, while maintaining the desired angles between the cutting blade or its sidebits and the ground. Now if hard-to-penetrate soils are to be cut and loaded for substantial periods of time and if it is accordingly desired to make only a 4" cut for example, the mere raising of the cutting blade by the 4" difference would alter the desired angles made by the cutting blade and sidebits with the ground to result in less efficient operation. However, with the first stops 38 being segmented, the operator could merely add a 4" segment thereto resulting in the downward motion of the bowl being limited at a point 4" higher with respect to the ground. By continued extension of the hydraulic jacks 31, the cutting blade could be lowered to its same position relative to the bowl as is shown in FIG. 1 where it would have the desired angle of approach to the ground, but since the bowl is positioned 4" higher relative to the ground, the blade would also be positioned now to make only a 4" cut. It is also to be noted that by proper selection of the segmented stop 38, the downward motion of the bowl could similarly be limited at a preselected point to serve as a guide during unloading of the scraper bowl to maintain a uniform strike off depth.

Further, the first stops 38 are of a construction suitable to act as springs or shock absorbers during carrying operation of the scraper to dampen the effect of an uneven haul road on the bowl which is carried on the stops. For example, the stops may comprise a resilient material such as rubber.

To simplify the scraper structure, each draft arm 14 is disposed inside the respective bowl sidewall 13 as shown in FIG. 1 and has a flange 41 on its outside surface which flange extends outwardly and rearwardly therefrom to overlap the front edge of the bowl sidewall 13. The flanges 41 serve to stabilize the upper edges of the bowl sidewalls and take the place of a spreader beam conventionally used between the walls.

What is claimed is:

1. In an earthmoving scraper, the combination comprising:
   a bowl pivotally connected to forwardly extending draft arms, said bowl having a floor and being open at its forward end,
   a member transversely secured to the bowl floor at the open end of said bowl, said member forming a cutting edge generally coextensive with the width of said bowl and having an arcuate forward surface,
   a cutting blade including a generally straight central portion with side bits extending outwardly and upwardly from each end thereof, said blade being pivotally secured to the forward end of said bowl adjacent the arcuate forward surface of said member, said blade being vertically positionable relative to said transverse member, the pivotal connections for said blade being disposed forwardly of both said blade and said transverse member to permit pivotal movement of said blade in proximity to the arcuate forward surface of said member, said blade forming a continuous ramp surface into the bowl in cooperation with the transverse member as said blade is raised and lowered relative to said member when said blade is positioned relatively lower than the cutting edge of said transverse member, and
   means for controlling the pivotal position of the cutting blade.

2. In an earthmoving scraper, the combination comprising:
   a bowl pivotally connected to forwardly extending draft arms, said bowl having a floor and being open at its forward end,
   a member transversely secured to the bowl floor at the open end of said bowl, said member forming a cutting edge generally coextensive with the width of said bowl,
   a cutting blade including a generally straight central portion adjacent said member with side bits extending outwardly, upwardly and forwardly from the central blade portion to form pivotal connections with respective side portions of said bowl, forward edges of said side bits forming a transverse angle of approximately 35° with the central blade portion, said blade being vertically positionable relative to said transverse member, the central portion of said blade forming a continuous ramp surface into said bowl in cooperation with said transverse member when said blade is positioned relatively lower than the cutting edge of said transverse member, and means for controlling the pivotal position of said cutting blade.

3. In an earthmoving scraper, the combination comprising:

a bowl pivotally connected to forwardly extending draft arms, said bowl having a floor and being open at its forward end, a member transversely secured to the bowl floor at the open end of said bowl, said member forming a cutting edge generally coextensive with the width of said bowl, a cutting blade including a generally straight central portion with side bits extending outwardly and upwardly from each end thereof, said blade being pivotally secured to the forward end of said bowl adjacent said member, said blade being vertically positionable relative to said transverse member, said blade forming a continuous ramp surface into the bowl in cooperation with said transverse member when said blade is positioned relatively lower than the cutting edge of said transverse member, and means for controlling the pivotal position of the cutting blade, said control means being suitably interconnected with the bowl, the draft arms and said cutting blade for regulating vertical positioning of said cutting blade and at least the forward end of said bowl, said control means including double-acting hydraulic jacks connected between the draft arms and said cutting blade, a first set of stops being disposed on said bowl to come into contact with the draft arms and limit downward motion of said bowl relative to the draft arms, a second set of stops being disposed on said bowl to be contacted by said cutting blade and limit upward motion of said cutting blade relative to said bowl.

4. The improved earthmoving scraper of claim 3 wherein said first set of stops is segmented and has elements which may be removed and added to vary the position of the bowl when its downward motion is limited by contact between said stops and the draft arms.

5. The improved earthmoving scraper of claim 3 wherein said first stops are shock absorbent to dampen shock transmitted therethrough from the draft arms to the scraper bowl which rests on said first stops during at least carry operation of the scraper.

References Cited

UNITED STATES PATENTS

| | | | |
|---|---|---|---|
| 2,268,175 | 12/1941 | Vaughn | 37—129 |
| 2,329,831 | 9/1943 | Ferguson | 37—141 |
| 2,450,721 | 10/1948 | Ditzler | 37—129 |
| 2,729,001 | 1/1956 | Adams | 37—141 |
| 2,759,276 | 8/1956 | Rockwell | 37—126 |
| 3,296,715 | 1/1967 | Jass et al. | 37—8 |
| 3,343,286 | 9/1967 | Ray et al. | 37—129 X |

EDGAR S. BURR, Primary Examiner

U.S. Cl. X.R.:

37—141